J. PECKOVER.
STONE SAW.
APPLICATION FILED JUNE 1, 1912.
1,065,833.
Patented June 24, 1913.
2 SHEETS—SHEET 1.
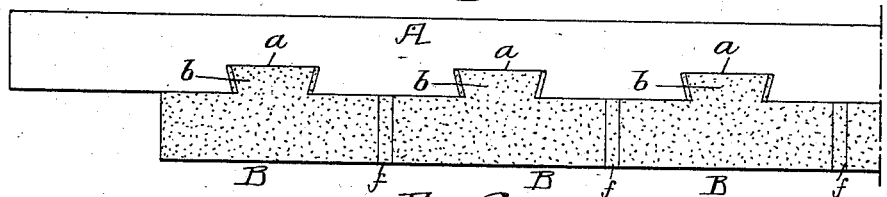
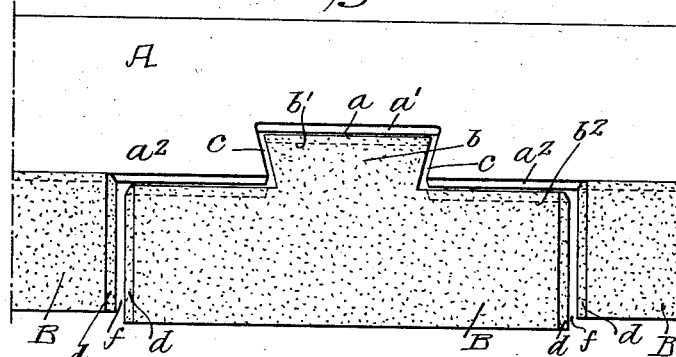
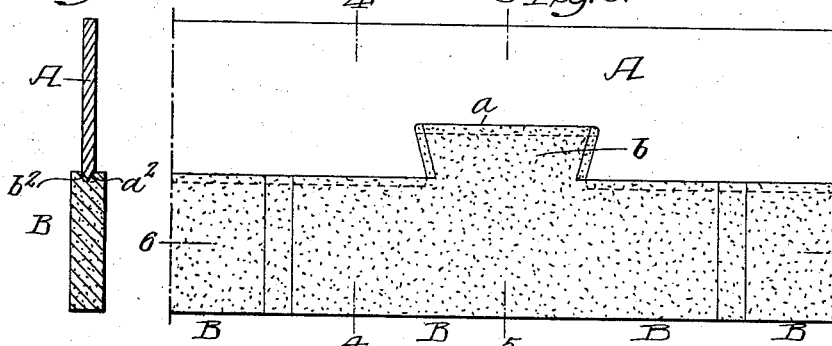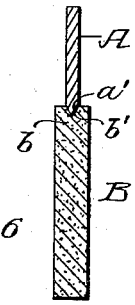
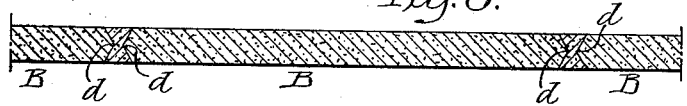
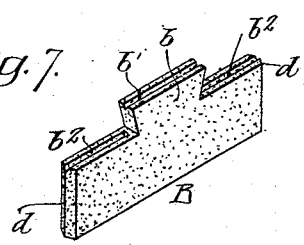
Witnesses—
Inventor—
James Peckover
by his Attorneys—
Howson & Howson J. PECKOVER.
STONE SAW.
APPLICATION FILED JUNE 1, 1912.
1,065,833.
Patented June 24, 1913.
2 SHEETS—SHEET 2.
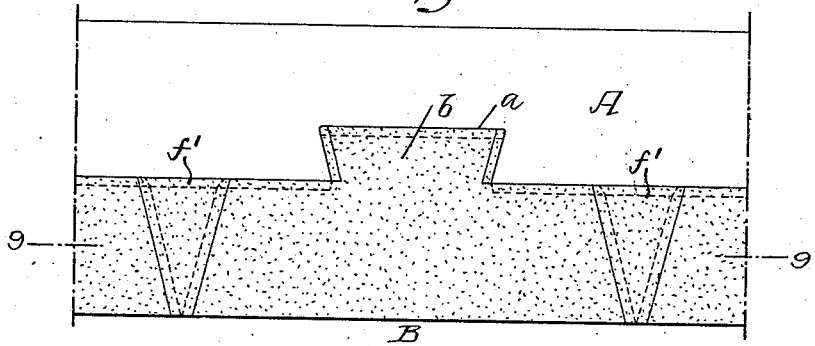
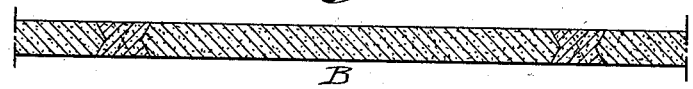
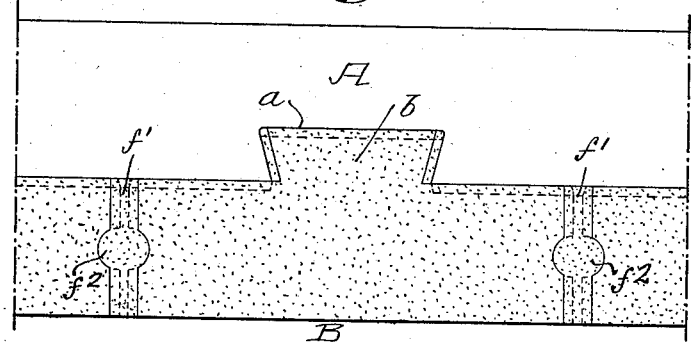
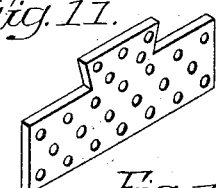
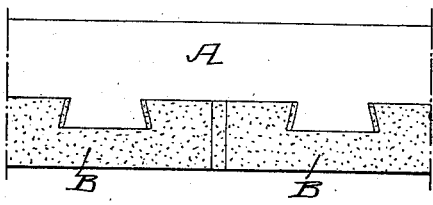
Witnesses—
Inventor—
James Peckover
by his Attorneys
Howsn & Howsn

UNITED STATES PATENT OFFICE.

JAMES PECKOVER, OF PHILADELPHIA, PENNSYLVANIA, ASSIGNOR OF ONE-THIRD TO JOHN SCANLIN AND ONE-THIRD TO HUMBERT B. POWELL, BOTH OF PHILADELPHIA, PENNSYLVANIA.

STONE-SAW.

1,065,833.

Specification of Letters Patent. Patented June 24, 1913.

Application filed June 1, 1912. Serial No. 700,958.

*To all whom it may concern:*

Be it known that I, JAMES PECKOVER, a citizen of the United States, residing in Philadelphia, Pennsylvania, have invented certain Improvements in Stone - Saws, of which the following is a specification.

The object of my invention is to construct a stone saw having a metallic body with detachable teeth made of a composition of abrading material.

A further object of the invention is to utilize a plastic material for securing the teeth to the blade and for securing one tooth to another. This plastic material is preferably of an abrasive nature so that when the teeth are inserted the saw will have a continuous abrading surface.

By my invention any one of the teeth can be readily removed and replaced, if broken, and yet when in place will be rigidly secured to the blade so as to properly cut marble, granite and other stone or analogous substances.

My invention dispenses with the use of loose abrading material.

In the accompanying drawings:—Figure 1, is a side view of my improved stone saw; Fig. 2, is an enlarged view, showing a tooth in position to be inserted in a saw blade; Fig. 3, is a view similar to Fig. 2, showing the teeth inserted in the blade; Fig. 4, is a sectional view on the line 4—4, Fig. 3; Fig. 5, is a sectional view on the line 5—5, Fig. 3; Fig. 6, is a sectional view on the line 6—6, Fig. 3; Fig. 7, is a perspective view of one of the teeth; Fig. 8, is a side view illustrating a modified form of tooth; Fig. 9, is a sectional view on the line 9—9, Fig. 8; Fig. 10, is a still further modification of a tooth; Fig. 11, is a perspective view illustrating a metallic reinforce for a tooth; and Fig. 12, is a view of a modification of a saw.

Referring to the drawings, A is a metallic blade having a series of notches $a$ spaced a given distance apart and $a'$ are V-shaped ribs extending across the base of each notch.

$a^2$ are V-shaped ribs on one edge of the blade extending from one notch to the other.

B are the teeth of the saw made of a composition of carborundum, emery, or other abrading material, and preferably of a greater thickness than the blade of the saw. Each tooth has an under-cut projection $b$, which extends into the notch $a$. In the upper edge of this projection is a V-shaped groove $b'$ into which extends the V-shaped rib $a'$ on the blade.

$b^2$ are V-shaped grooves at each side of the projection into which extend the ribs $a^2$.

The projection $b$ is of such a size that the tooth can be placed laterally in the notch, as in Fig. 2, and then forced against the blade A, as in Fig. 3, so that the ribs $a'$ and $a^2$ will extend into the grooves of the tooth. This leaves spaces $c$—$c$ between the walls of the notches and the projections $b$. Each space is filled with a composition having an abrasive material as its base. When this composition sets, it forms a portion of the tooth. The end $d$ of each tooth is in the form of a V-shaped rib and the teeth are preferably spaced apart, as indicated at $f$, Figs. 2 and 6. The same composition is placed in the space $c$ as is placed in the space $f$ and when this composition hardens, it is of such a nature as to satisfactorily perform the function for which it is intended. When a series of teeth are in place and properly cemented, then there is a continuous abrasive edge from one end of the saw to the other. Each tooth is rigidly held in position and cannot come out of alinement. If a tooth should break, then the fragments can be quickly removed and a new tooth inserted without disturbing the other teeth.

I preferably make the teeth of a solid composition and, in some instances, the teeth may be provided with a reinforcing metal plate, as illustrated in Fig. 11, having perforations through which the abrading material can extend; the abrading material being placed on both sides of the plate and the sections being tied together by the material extending through the perforations.

In Fig. 8, I have illustrated a modification of the form of the ends of the teeth. The teeth, in this instance, are beveled so as to form a V-shaped opening $f'$ into which the abrading material is placed. When the abrading material is set, there is a continuous abrasive surface, as in the construction described above.

In Fig. 10, I have shown another form of blade in which there are segmental recesses $f^2$ in the end of each blade in addition to the beveled ribs so as to increase the effectiveness of the joint.

I preferably make the teeth of a composition consisting of carborundum, or emery, plaster of Paris, and shellac, dissolved in naphtha and mixed to a stiff paste, after which it is placed in paper lined molds; remaining in the molds until it is thoroughly dried and hardened by being subjected to a moderate degree of heat.

In attaching the teeth to the blade, I lay the blade on a flat surface with one edge projecting. I then place the tooth in its recess and force it against the blade so that the ribs $a'$ and $a^2$ will enter the recesses $b'$ and $b^2$ of the teeth; first placing a small quantity of the soft composition in the recesses so that when the edge is forced against the blade a perfect joint will be formed. The spaces $c$—$c$ are then filled with the soft composition, as well as the spaces $f$—$f$ between the several teeth. This composition is packed firmly in place and the teeth are held against the saw blade until the composition is thoroughly hardened, after which the blade, with the teeth firmly attached thereto, can be removed and will be ready for use.

In some instances, instead of the blade having projecting ribs $a'$ and $a^2$ and the teeth having recesses to receive the ribs, the teeth may be ribbed and the blade recessed, as in Fig. 12, forming, in fact, elongated notches with the abutting edges of the teeth in the notches.

By providing V-shaped ribs at each end of the teeth, lateral movement of the composition filling is prevented and the stability of the tooth is increased. By having the ribs in the recess of the blade and on the edge of the blade, movement of the tooth is prevented; each tooth being held in the proper alinement.

I claim:

1. In a stone saw, the combination of a blade, a plurality of teeth formed of abrasive material carried by said blade, said teeth having their portions beyond the blade spaced apart a slight distance, means for securing said teeth to the blade, and an abrasive filling for the spaces between the teeth whereby a continuous cutting edge is formed.

2. The combination, in a stone cutting saw, of a blade having dovetail recesses, a plurality of teeth formed of abrasive material, each of said teeth having a dovetail projection for disposal within a recess in said blade and being spaced apart a slight distance beyond the blade, said projections being less in width than the recesses, bodies of self-hardening plastic material filling the spaces between the projections and blade whereby the tooth may be locked in place, and bodies of abrasive material between the teeth whereby a continuous cutting edge is formed.

3. In a stone saw, the combination of a metal blade having dovetail notches at one edge, a series of teeth, each having a projection adapted to a notch of the blade, said teeth being made of an abrasive composition and the projections of the same being less in width than the notches of the blade and the teeth being spaced apart beyond the blade, and self-hardening abrasive material filling the spaces between the teeth and between the teeth and blade and rigidly holding the teeth in place.

4. In a stone saw, the combination of a metal blade, a cutting edge formed of independent and separately set teeth, said teeth being spaced apart beyond the blade, and abrasive material filling the spaces between teeth whereby a continuous cutting edge is formed.

5. The combination, in a stone saw, of a blade having a series of notches therein, a series of teeth made of an abrasive material, each having an undercut projection adapted to one of said notches, V-shaped projections on the blade adapted to engage V-shaped recesses in each tooth, the ends of said teeth beyond the blade being spaced apart and having V-shaped projections, and abrasive material filling the spaces between the teeth and locked in place by the projections thereof whereby a continuous cutting edge is formed.

6. The combination, in a stone saw, of a blade having a series of notches therein, a series of teeth made of an abrasive material each having an undercut projection adapted to one of said notches, abrasive material locking said teeth to the blade, V-shaped projections on the blade adapted to engage V-shaped grooves in each tooth and the ends of said teeth beyond the blade being spaced apart and having V-shaped projections, and abrasive material filling the spaces between those portions of the teeth beyond the blade and locked in place by the projections thereof whereby a continuous cutting edge is formed.

In testimony whereof, I have signed my name to this specification, in the presence of two subscribing witnesses.

JAMES PECKOVER.

Witnesses:
W<small>M</small>. E. S<small>HUPE</small>,
W<small>M</small>. A. B<small>ARR</small>.